United States Patent [19]
Huignard et al.

[11] Patent Number: 5,075,573
[45] Date of Patent: Dec. 24, 1991

[54] LOW-NOISE OPTICAL WAVE AMPLIFICATION DEVICE

[75] Inventors: Jean-Pierre Huignard; Henri Rajbenbach, both of Paris, France

[73] Assignee: Thomson-CSF, Puteaux, France

[21] Appl. No.: 524,285

[22] Filed: May 16, 1990

[30] Foreign Application Priority Data

May 16, 1989 [FR] France ................ 89 06344

[51] Int. Cl.$^5$ ............................................. H01F 7/00
[52] U.S. Cl. .................................. 359/326; 307/424; 372/21; 372/22; 330/4.5; 330/4.9
[58] Field of Search ............ 350/353, 354, 355, 3.64, 350/3.61; 330/4.3, 4.5, 4.6, 4.9; 307/424, 425; 372/21

[56] References Cited

U.S. PATENT DOCUMENTS

| | | | |
|---|---|---|---|
| 3,988,593 | 10/1976 | Dewey, Jr. ................ | 307/88.3 |
| 4,576,434 | 3/1986 | Huignard et al. ........... | 350/3.64 |
| 4,586,779 | 5/1986 | Huignard et al. ........... | 350/3.64 |
| 4,703,992 | 11/1987 | Yeh ............................ | 350/3.64 |
| 4,761,059 | 8/1988 | Yeh et al. ................... | 350/354 |
| 4,767,195 | 8/1988 | Pepper ....................... | 350/354 |
| 4,773,739 | 9/1988 | Valley et al. ............... | 350/354 |

FOREIGN PATENT DOCUMENTS 0275768 7/1988 European Pat. Off. .

Primary Examiner—Frank Gonzalez
Assistant Examiner—Galen J. Hansen
Attorney, Agent, or Firm—Oblon, Spivak, McClelland, Maier & Neustadt

[57] ABSTRACT

The invention relates to a low-noise amplification device of an optical wave. Signal wave ($F_s$) to be amplified interferes with a pump wave ($F_p$) in such a nonlinear medium (1) as a photorefractive crystal. To reduce the noise considerably, even to eliminate it, the establishing of noise-generating interferences therefore is prevented by moving, by rotation around an axis O, the nonlinear medium.

10 Claims, 4 Drawing Sheets

LOW-NOISE OPTICAL WAVE AMPLIFICATION DEVICE

The invention relates to an optical wave amplification device and more particularly an optical signal amplification device based on the interaction of two waves in a nonlinear medium with photoinduced index variation (for example, photorefractive crystal). The originality of the device exhibited results from the use of new means of eliminating the noise characteristic of the amplifying medium. The device assures the coherent amplification of wavefronts containing space data with an excellent signal/noise ratio in the detection plane.

The invention is applicable to devices of detection, coherent amplification and phase conjugation of wavefronts. More particularly, it is applicable to the amplification of images by two-wave interaction in a photorefractive crystal.

Figure 1:
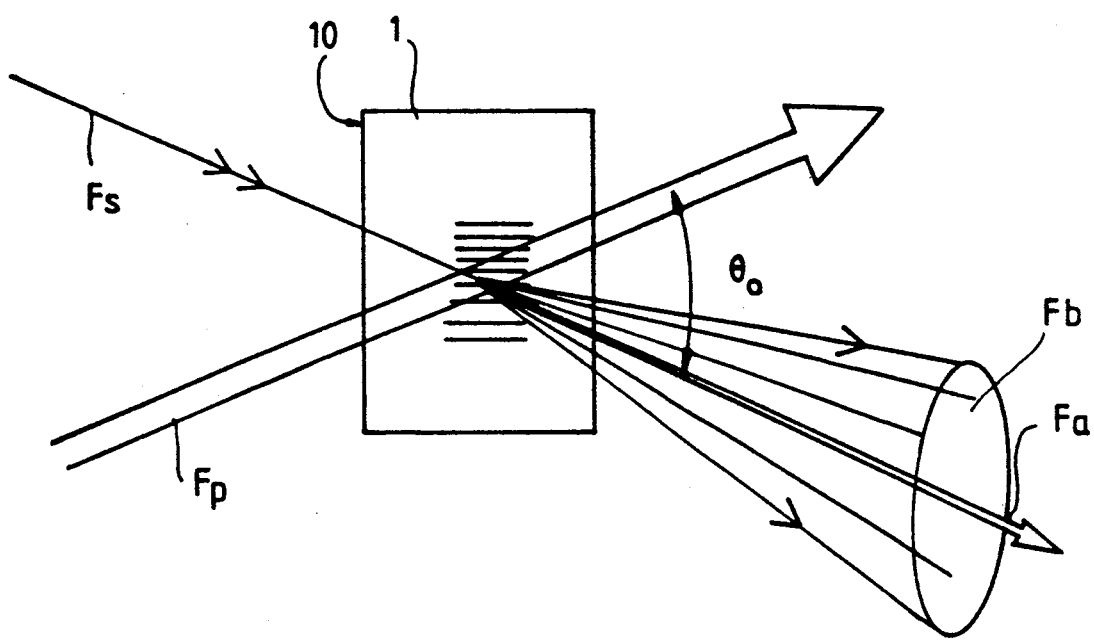
Figure 2:
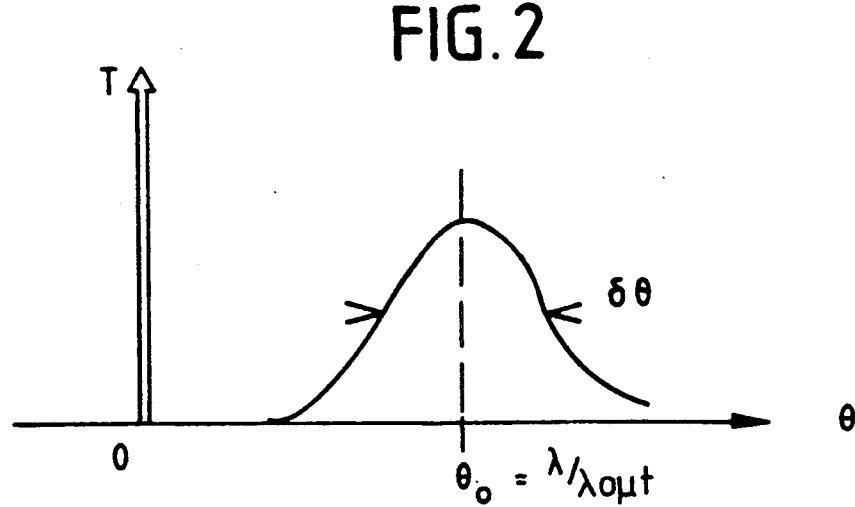

The photorefractive amplifiers (GaAs, BaTiO$_3$, LiNbO$_3$, BSO . . . ) intrinsically have very high gain coefficients $\Gamma$ making possible the effective amplification of probe beams of very low intensity ($\Gamma \simeq 5$ to $15$ cm$^{-1}$ after optimization according to the materials used). These high-gain interactions are perfectly well suited to the generation of conjugate waves as well as to the amplification and to the processing of two-dimensional images. However, as in any amplification mechanism, there exists a noise spectrum characteristic of the nonlinear medium which degrades the signal/noise ratio in the plane of the amplified signal. In particular, the contribution of the noise is all the more notable as the incident signal is low. The origin of the noise in these materials can be described as follows: the incident pump wave interferes with the waves generated by all the microdefects of the nonlinear crystal (index irregularities; scratches on the surfaces and multiple reflections on the interfaces of the crystal). These elementary waves constitute so many probe beams (or signal beams) having random amplitudes and phases. After interaction of the two wave type (pump-probe), this group of parasitic beams is effectively amplified in the only angular directions exhibiting a high gain. Thus, at the output of the crystal, a characteristic noise figure of the crystal such as is shown in FIG. 1 is observed where signal beam $F_s$ is seen which interferes with pump beam $F_p$ to give an amplified signal Fa and where noise Fb is seen. The crystal optionally is subjected to an electric field applied by a voltage $V_{(t)}$ such as that which is shown in FIG. 1. In FIG. 2, it is seen that the width and the position of the lobe of the noise characterize the dependance of the gain coefficient as a function of the space frequency, which corresponds to a response of the bandpass type according to the materials used.

To obtain an effective amplification of an outside probe wave, the latter must be positioned in the angular direction corresponding to the gain maximum of the amplifier (for example, $\theta = \lambda/\Lambda_{opt}$ with $\Lambda_{opt}^{-1}$ = optimal space frequency). If an effective amplification of the probe wave is obtained in the photorefractive amplifier under these conditions, there consequently results a significant contribution of the intrinsic noise to the nonlinear medium. The signal to noise ratio of such an amplifier therefore is limited since amplified noise and signal are optimized for the same angular directions. According to these principles, it seems impossible to satisfy simultaneously the two following conditions: high gain on the applied signal (for example, 2D), and high signal to noise ratio in the plane of the amplified image. Nevertheless, the applications of these materials to the processing and control of the coherent beams make it necessary to satisfy these two contradictory conditions. To do this, a new technique is proposed according to the invention making it possible to reduce the noise considerably, and even practically to eliminate it, while maintaining an amplified signal of excellent quality. The technique is based on a time filtering of two signals (noise; amplified signal) by taking into account the fact that the response time of the two phenomena can be widely different.

The invention therefore relates to a low-noise optical wave amplification device comprising a photorefractive medium receiving, by an input face, a signal beam to be amplified and a pump beam providing in exchange an amplified beam, characterized in that the means associated with the photorefractive medium make it possible to make the photorefractive medium turn so that the input face turns relative to the signal and pump beams.

The invention also relates to a low-noise optical wave amplification process in which a photorefractive medium receives a signal beam to be amplified and a pump beam and provides in exchange an amplified beam resulting from the interference of the signal beam and the pump beam, characterized in that an oscillation movement is imparted to the photoretractive medium around an axis not located in the zone of interference of the signal and pump beams.

Figure 3:
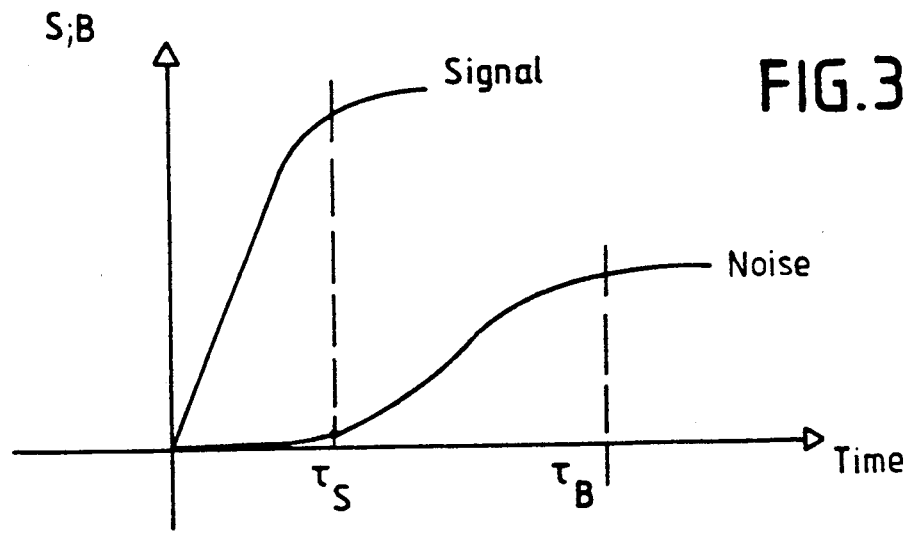
Figure 4:
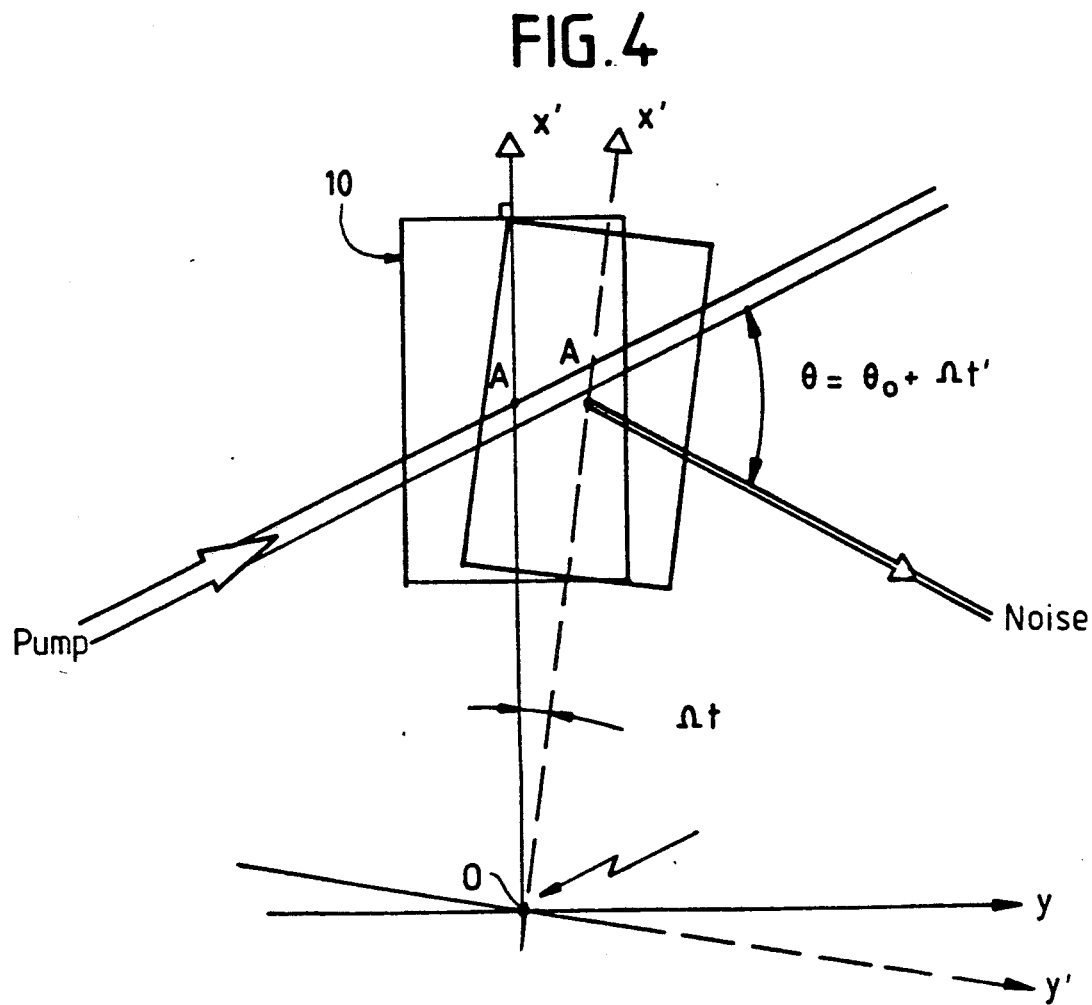
Figure 5:
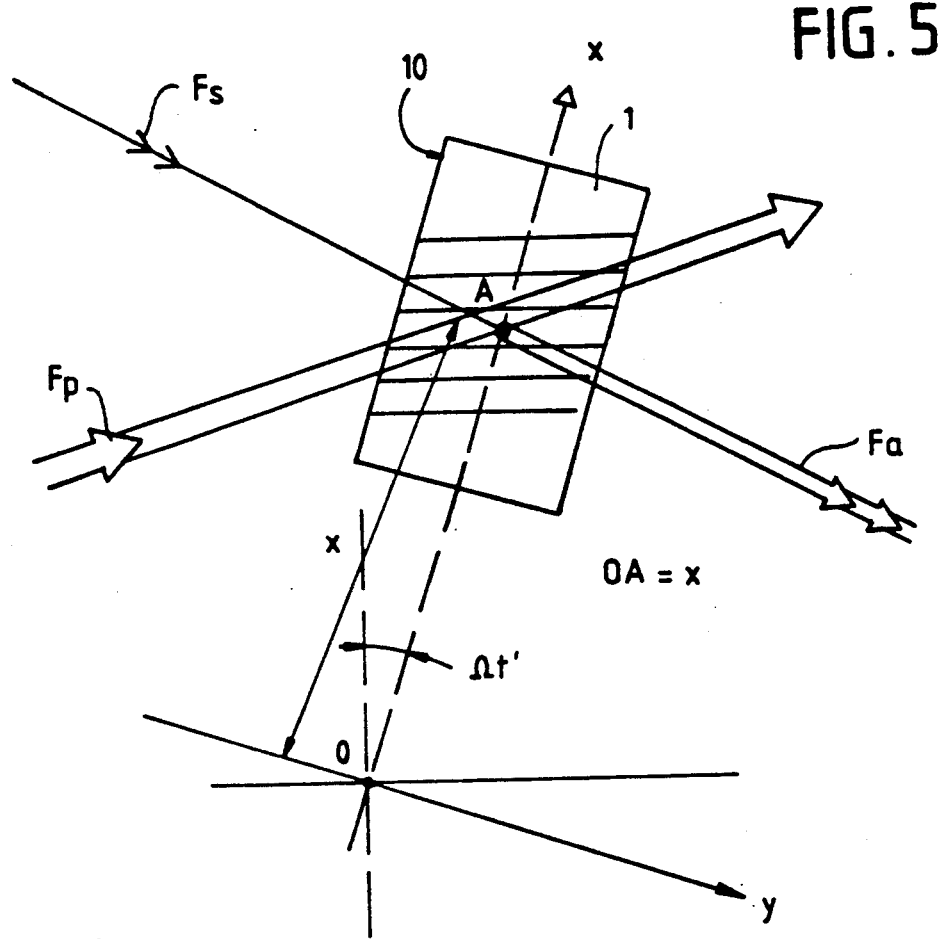
Figure 6:
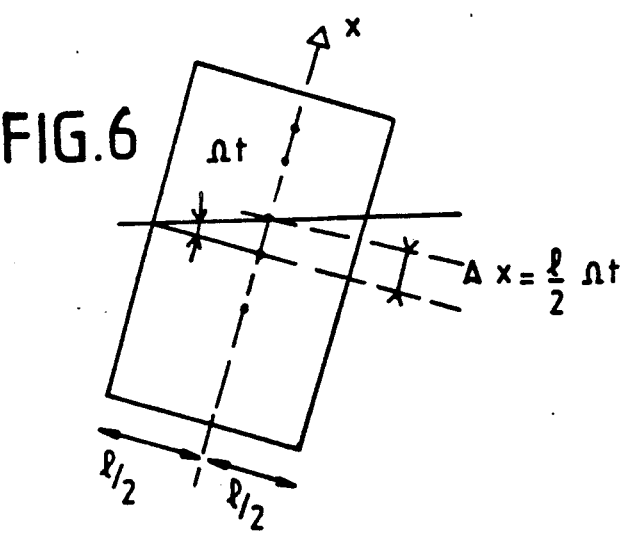
Figure 8:
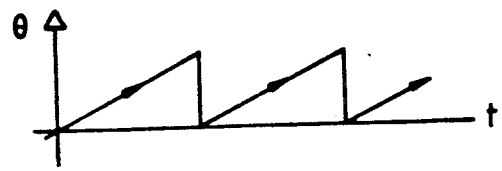
Figure 7:
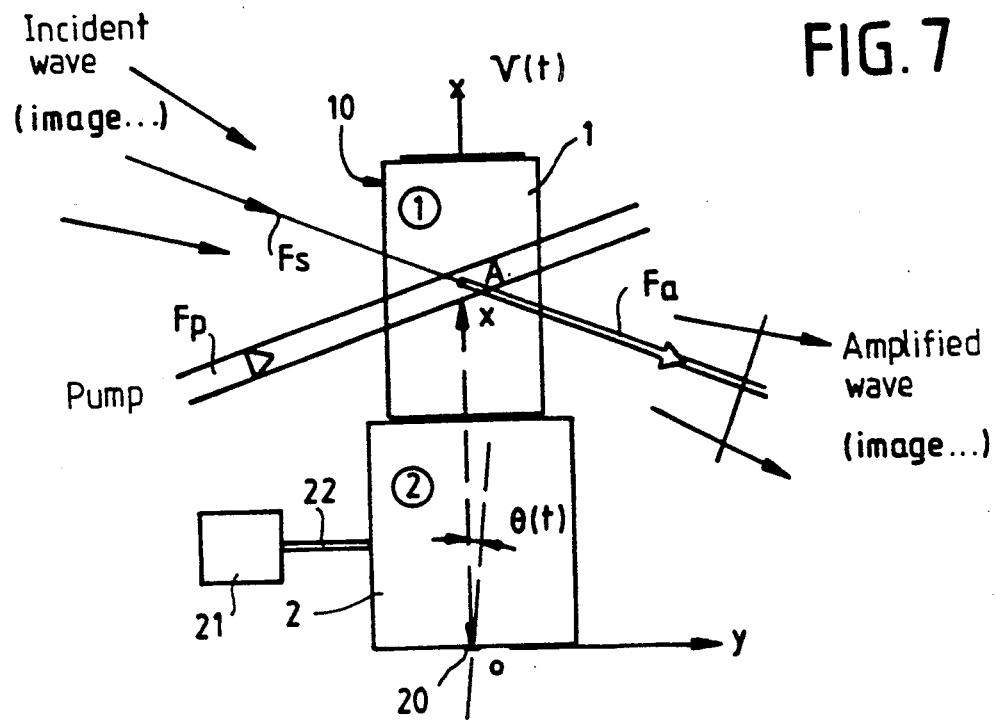
Figure 9:
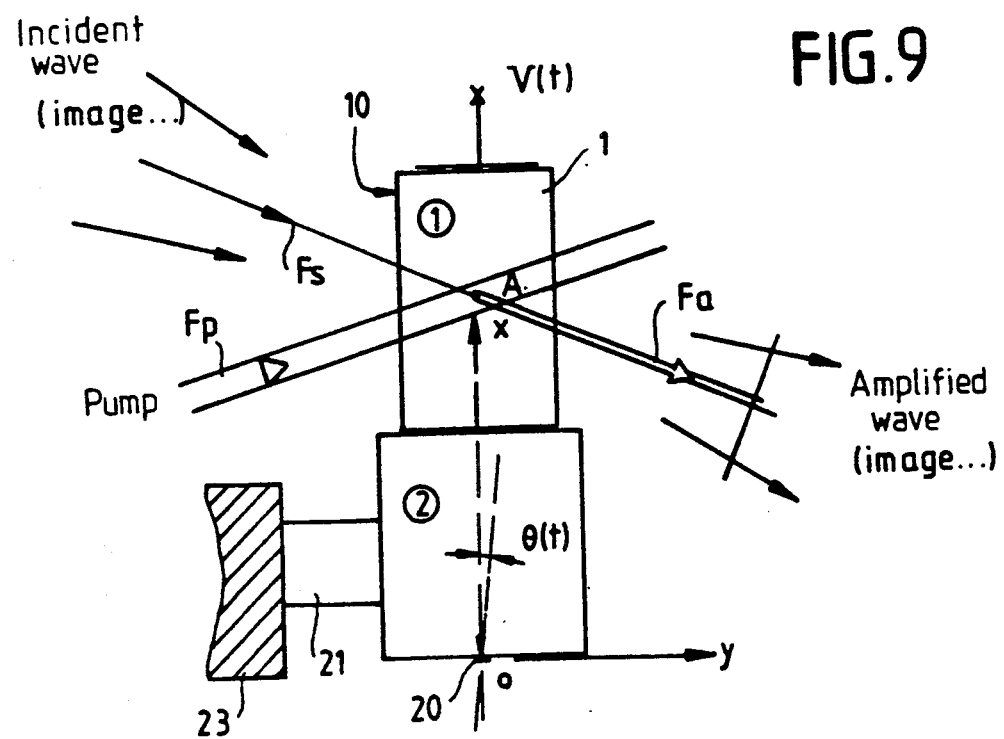

The various objects and characteristics of the invention will come out more clearly in the following description given by way of example in referring to the accompanying figures which show:

FIG. 1, an amplification device showing the amplified signal and an amplification noise;

FIG. 2, a characteristic gain curve of a nonlinear, optical medium;

FIG. 3, curves for establishing the lattices of indexes associated with the interferences of a pump wave with, on one hand, a signal beam, on the other hand, noise;

FIG. 4, a system according to the invention showing the influence of a rotation of photorefractive medium in the direction of the noise of the amplification device;

FIG. 5, a system according to the invention showing the influence of a rotation on the amplification of a probe (or signal) beam;

FIG. 6, a system according to the invention describing the movement of signal-pump fringes during the rotation of the crystal;

FIGS. 7 and 9, embodiments of the device according to the invention;

FIG. 8, an example of curve of the movement of rotation of the amplifying medium.

As has been described above in relation to FIG. 1, the interference, in a nonlinear medium, such as photorefractive crystal 1 of FIG. 1, of a probe beam (or signal beam) $F_s$ and a pump beam $F_p$, gives rise to an amplified signal Fa and to noise Fb.

By way of example, FIG. 2 illustrates enable times $\tau_B$ of the noise and $\tau_S$ of an amplified signal after two-wave interaction in a medium 1 with a GaAs base. Taking into account the inertia of the noise phenomenon, the basic idea consists in "jamming" the interference system corresponding to the noise by displacing the crystal.

Therefore, as shown in FIGS. 4 to 7, the invention provides for making photorefractive crystal 1 turn around an axis O so that input face 10 of the crystal turns relative to the incident beams.

More precisely, if it is considered that probe beam $F_s$ and pump beam $F_p$ are oriented in the directions contained in a plane perpendicular to face 10 of photorefractive crystal 1, it advantageously will be provided that axis O is perpendicular to this plane. Axis O also can be contained in a plane parallel to the bisecting plane of the probe beam and the pump beam. More generally, it is sufficient that axis O have a nonzero projection on this plane thus defined.

Moreover, so that the movement of the crystal makes it possible to disturb the establishing of interferences in the crystal, it advantageously will be provided that axis O is located outside of the crystal and preferably at a distance approximately equal to the height of the crystal as is shown in FIGS. 4, 5 and 7.

As a result of the observation of the curves of establishing the amplified signal and the amplified noise shown in FIG. 3, it is necessary that the rate of displacement of the crystal be sufficient to affect the amplification of the noise but less than a limit value to affect only very little the gain mechanism on the signal wave which is much quicker to establish itself. In FIG. 3, it is seen, therefore, that it is necessary that the characteristic time of the disturbance (rotation) is between characteristic times $\tau_s$ and $\tau_B$.

The modeling of the "jamming" effect of the interference system generating the noise can be described as follows:

The interference between the pump wave and a noise wave diffused in A in direction $\theta$ relative to the pump wave is written:

$$I(x) = I_0[1 + m_B \cos(2\pi/\lambda\theta x)] \quad (1)$$

Expression in which: $I_o$ = incident intensity, $m_B$ rate of modulation of the fringes connected to the noise; $\lambda$ wavelength in the photorefractive medium ($\lambda = _{o/n}$ where n is the index of the medium and $\lambda_o$ the wavelength in the vacuum), $\theta$ = angle between the two beams in the medium.

When the crystal turns at angular rate $\Omega$ from the vertical position (FIGS. 4 and 5), relation (1) is written in reference mark x, y connected to the crystal:

$$I(x,t) = I_0[1 + m \cos 2\pi/\lambda(\theta_o + \Omega t)x] \quad (2)$$

or:

$$I(x,t) = I_0[1 + m \cos K(x + xt/\theta_o)] \quad (3)$$

Turning the crystal at angular rate $\Omega$ therefore is equivalent at point A of abscissa x to moving the figure of interference generating the noise at rate $v_B$ such that:

$$v_B = \Omega x/\theta_o \quad (4)$$

When the figure of interference moves at rate $v_b$, the index variation resulting from the photorefractive effect is in the form:

$$\Delta n(x,t) = \Delta n_s \cos(Kx + v_B t + \phi_B)/(1 + K^2 v_B^2 \tau_B^2)^{\frac{1}{2}}$$

with $$tg\phi_B = K v_B \tau_B; K = 2\pi\theta_o/\lambda \quad (5)$$

$\Delta n_s$: maximum of photoinduced index variation in the crystal.

Under these conditions, the index variation associated with the noise figure is insignificant when condition:

$$K v_B \tau_B >> 1$$

or:

$$\Omega >> \Omega_B$$

with $\Omega_B = \lambda/(2\pi\tau_B x)$, $\Omega_B$ being an angular rate from which the noise is affected, is satisfied.

The corresponding rate of displacement for point A selected at the center of the crystal (OA = x) is on the order of 200 microns $s^{-1}$ with the following numerical values:

$$\lambda_o = 1 \ \mu m; \tau_B = 100 \ ms \quad (6)$$

When the crystal turns at this low constant angular rate, the space period of the main lattice is not affected ($\Lambda = \lambda/\theta_o$), and the interference lattice also turns around axis O (FIG. 6). A translation rate of fringes $v_s$ corresponds to it such that:

$$v_s = (l/a)\Omega \quad (7)$$

The index variation associated with the main lattice is written:

$$\Delta n(x,t) = m_s \Delta n_s \cos(Kx + v_s t + \phi_s)/(1 + K^2 v_s^2 \tau_s^2)^{\frac{1}{2}} \quad (8)$$

$m_s$: rate of modulation of the signal-pump fringes.

The main lattice therefore will be very little affected by the angular rotation of the crystal if condition:

$$K v_s \tau_s < 1$$

or $$\Omega \leq \Omega_s$$

with $\Omega = \Lambda/\pi \cdot \tau_s \cdot l; \Omega_s$ being an angular rate (9) from which the signal would be affected, is satisfied. Relations 6 and 9 therefore show that a large field of angular rotation rates of the crystal exists making it possible to satisfy simultaneously the following two conditions:
  elimination of the noise $= \Omega >> \Omega_B$
  high gain of the signal wave applied to the photorefractive amplifier: $\Omega \leq \Omega_s$ For example, $\Omega_s = 10^2 \ \Omega_B$ can be obtained with the following experimental conditions:

$\Lambda = 20 \ \mu m$;
$\lambda_O = 1 \ \mu m$;
$l = x = 10 \ mm$;
$\tau_s = 10 \ ms$;
$\tau_B = 100 \ ms$.

FIG. 7 shows an embodiment of the device according to the invention. It comprises a photorefractive crystal 1 (such as BSO, BaTiO3, LiNbO3, GaAs ...) whose one face 10 receives a signal beam $F_s$ and pump beam $F_p$. These two beams are contained approximately in a plane itself perpendicular to face 10. Two beams $F_s$ and $F_p$ interfere in the photorefractive crystal and provide an amplified signal beam Fa.

Photorefractive crystal 1 is mounted on a platform 2 mobile around an axis O.

Control means 21 act by a connection 22 to control the rotation of platform 2 around axis O.

This rotation can be performed in the form of a sawtooth angular oscillation as shown in FIG. 8.

Control means 21 also can be, as shown in FIG. 9, a piezoelectric ceramic or a bimetallic strip which rests on a stationary reference 23 and which, under the control of an electric signal, provided by means not shown, is deformed and controls the angular movement of rotation of platform 2.

By way of example, it has been found that for an amplifying crystal in GaAs and for the following values:

Wavelength $\lambda = 1.06$ microns (YAG)
Interaction length $l = 10$ mm $- 5 \times 5$ mm$^2$
Pump intensity $I_p = 10$ mW·cm$^{-2}$
Space period $\Lambda_{opt} = 20$ microns
Time constants: $\tau_s = 10$ ms; $\tau_B = 100$ ms
Distance from the axis of rotation: $OA = x = 10$ mm
Small signal gain coefficient: $\Gamma = 5$ cm$^{-1}$
The following results could be obtained:

$\Omega_s = 60$ mrd s$^{-1}$ $\Omega_B = 0.2$ mrd s$^{-1}$

Selection of rate of rotation $\Omega$ of the crystal, for example $\Omega = 5$ to 10 mrd s$^{-1}$
gain on the signal wave: $\times 100$ The device of the invention makes it possible simultaneously to obtain a high gain and a very good signal/noise ratio in the photorefractive type amplifiers. All of these properties are obtained by controlling the angular rate of rotation of the nonlinear medium. The principles set forth can be transferred to any other nonlinear medium making possible the coherent amplification of beams by two-wave or four-wave interaction.

Optronic applications of this device:
phase conjugation with high signal/noise ratio
detection and amplification of waves for LIDAR
amplification of images
autoinduced cavities starting on the applied signal and not on the noise.

It is quite obvious that other variants can be considered in particular concerning the means to give a movement of rotation to the nonlinear medium in which the wave to be amplified and the pump wave interfere, as well as concerning the orientation of the axis of rotation.

We claim:

1. A low-noise optical wave amplification device, comprising:
 a photorefractive medium receiving, at an input face, a signal beam to be amplified and a pump beam, said pump beam and said signal beam interacting to form a zone of interference within said photorefractive medium, and said medium including means for providing as an output, an amplified beam; and
 means, associated with said photorefractive medium, for adjustably rotating said refractive medium about an axis located outside of said zone of interference of said signal and pump beams so that said input face of said photorefractive medium turns relative to said signal and pump beams.

2. Amplification device according to claim 1, wherein said photorefractive medium (1) is integral with a platform (2) which is rotatable about said axis (20) located outside of photorefractive medium (1).

3. Amplification device according to claim 2, further comprises a rotation control means (21) associated with platform (2).

4. Amplification device according to claim 3, wherein said control means (21,22) comprises a mechanical oscillation control device.

5. Amplification device according to claim 3, wherein said control means (21) comprises a device with a piezoelectric ceramic base.

6. Amplification device according to claim 3, wherein said control means (21) comprises a bimetallic strip.

7. Amplification device according to claim 3, wherein said rotation control means (21) comprises a means for causing oscillation movement of platform (2).

8. A low-noise optical wave amplification process comprising the steps of:
 providing, to a refractive medium, a signal beam to be amplified and a pump beam;
 outputting, from said photorefractive medium, an amplified beam as the result of interference of said signal beam and said pump beam; and
 imparting, by way of a rotation means associated with said photorefractive medium, rotational movement to said photorefractive medium wherein said rotational movement is about an axis located outside of a zone of interference of said signal and pump beams.

9. Optical wave amplification process according to claim 8, wherein the oscillation movement is an oscillation of low amplitude.

10. Optical wave amplification process according to claim 8, wherein the oscillation movement is an oscillation of great amplitude.

* * * * *